US006957327B1

(12) United States Patent
Gelman et al.

(10) Patent No.: US 6,957,327 B1
(45) Date of Patent: Oct. 18, 2005

(54) BLOCK-BASED BRANCH TARGET BUFFER

(75) Inventors: Anatoly Gelman, San Diego, CA (US); Russell Schnapp, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/429,590

(22) Filed: Oct. 28, 1999

Related U.S. Application Data

(60) Provisional application No. 60/114,297, filed on Dec. 31, 1998.

(51) Int. Cl.[7] .................................................. G06F 9/00

(52) U.S. Cl. ....................................... 712/238; 712/237

(58) Field of Search ................................. 712/237–240

(56) References Cited

U.S. PATENT DOCUMENTS 4,894,772 A * 1/1990 Langendorf ................. 712/240
5,127,091 A * 6/1992 Boufarah et al. ........... 712/238
5,295,249 A * 3/1994 Blaner et al. ............... 712/213
5,386,519 A * 1/1995 Nakamura et al. .......... 712/238
5,442,756 A * 8/1995 Grochowski et al. ....... 712/238
5,752,259 A * 5/1998 Tran ........................... 711/125
6,185,675 B1 * 2/2001 Kranich et al. ............. 712/238

OTHER PUBLICATIONS

Hennessy John L. and David A. Patterson, Computer Architecture: A Quantitative Approach, 1996, Morgan Kaufmann Publishers, 2nd ed., 262-271.*

* cited by examiner

*Primary Examiner*—Bunjob Jaroenchonwanit
*Assistant Examiner*—Scott M. Collins
(74) *Attorney, Agent, or Firm*—Lisa K. Jorgenson; William A. Munck

(57) ABSTRACT

The invention provides a method and apparatus for branch prediction in a processor. A fetch-block branch target buffer is used in an early stage of pipeline processing before the instruction is decoded, which stores information about a control transfer instruction for a "block" of instruction memory. The block of instruction memory is represented by a block entry in the fetch-block branch target buffer. The block entry represents one recorded control-transfer instruction (such as a branch instruction) and a set of sequentially preceding instructions, up to a fixed maximum length N. Indexing into the fetch-block branch target buffer yields an answer whether the block entry represents memory that contains a previously executed a control-transfer instruction, a length value representing the amount of memory that contains the instructions represented by the block, and an indicator for the type of control-transfer instruction that terminates the block, its target and outcome. Both the decode and execution pipelines include correction capabilities for modifying the block branch target buffer dependent on the results of the instruction decode and execution and can include a mechanism to correct malformed instructions.

29 Claims, 5 Drawing Sheets

BLOCK-BASED BRANCH TARGET BUFFER

This application claims the benefit of U.S. Provisional Application No. 60/114,297 filed on Dec. 31, 1998.

RELATED APPLICATIONS

Inventions described herein can be used in combination or conjunction with inventions described in the following patent application(s):

Provisional Application Ser. No. 60/114,296, filed Dec. 31, 1998, in the name of Anatoly Gelman, titled "Call-Return Branch Prediction," assigned to the same assignee, and all pending cases claiming priority thereof.

These applications are each hereby incorporated by reference as if fully set forth herein. These applications are collectively referred to herein as "incorporated disclosures."

BACKGROUND OF THE INVENTION

1. Field of the Invention

This invention relates to computer processor design.

2. Related Art

One way to achieve higher performance in computer processors employing pipelined architecture, is to keep each element of the pipeline busy. Usually, the next instruction to enter the computer pipeline is the next sequentially available instruction in program store. However, this is not the case when a change in a sequential program flow-occurs (for example by execution of a control transfer instruction). In order to avoid flushing and restarting the pipeline due to changes in sequential program flow, it is desirable to select a path on which instruction execution is more likely to proceed, and to attempt to process instructions on that more likely path. This technique is known as branch prediction. If the predicted path is correct, the processor need not be unduly delayed by processing of the control transfer instruction. However, if the predicted path is not correct, the processor will have to discard the results of instructions executed on incorrect path, flush its pipeline, and restart execution on correct path.

One known prediction method is to cache, for each control transfer instruction, some history as to whether the branch was taken and the target. Each such instruction is allocated a location in a branch target buffer, each location of which includes the relevant information. While this known method generally achieves the purpose of predicting the flow of execution, it is subject to several drawbacks. First, for superscalar processors, it is desirable for instructions to be fetched in batches, such as 2 or more instructions at once, and so the branch target buffer has added complexity for having to determine the first control transfer instruction in the batch, rather than merely whether there is history for any such control transfer instruction. Second, for computers with a variable-length instruction set, instruction boundaries are not known until instructions are decoded, and so the branch target buffer would need to be coupled to the decode stage of the pipeline and this would cause pipeline flushing for each predicted taken instruction.

Accordingly, it would be advantageous to provide an improved technique for branch prediction in a processor, in which the branch target buffer is coupled to an early pipeline stage of the computer processor, and in which batches of instructions can be fetched at once without presenting unnecessary timing delays that would negatively impact the performance.

SUMMARY OF THE INVENTION

The invention provides a method and apparatus for branch prediction in a processor. A fetch-block branch target buffer is used, which stores information about a control transfer instruction for a "block" of instruction memory. The block of instruction memory is represented by a block entry in the fetch-block branch target buffer. The block entry represents one recorded control-transfer instruction (such as a branch instruction) and a set of sequentially preceding instructions, up to a fixed maximum length N. Indexing into the fetch-block branch target buffer yields an answer whether the block represents memory that contains a previously executed control-transfer instruction, a length value representing the amount of memory that contains the instructions represented by the block, and an indicator for the type of control-transfer instruction that terminates the block, its target and predicted outcome. The decode and execute pipeline stages of the computer include correction capabilities for modifying the fetch block branch target buffer dependent on the results of the instruction decoding and execution.

DETAILED DESCRIPTION OF THE PREFERRED EMBODIMENTS

In the following description, a preferred embodiment of the invention is described with regard to preferred process steps and data structures. Embodiments of the invention can be implemented using circuits in a processor or other device, adapted to particular process steps and data structures described herein. Implementation of the process steps and data structures described herein would not require undue experimentation or further invention.

In a preferred embodiment, a fetch-block branch target buffer stores information (in a block entry) for a block of executed instructions (the last instruction of which may cause an altered control flow). This information can be stored in the fetch-block branch target buffer as a block entry upon detection of the execution of an instruction that changed the control flow of the program (a control-transfer). As the processor prepares to load instructions into the instruction fetch and decode pipeline, the address of the first instruction to be fetched can be applied to the fetch-block branch target buffer. If the fetch-block branch target buffer contains a block entry corresponding to the address, this embodiment determines how many instruction bytes can be loaded into the pipeline to reach the control transfer instruction that previously caused the control-transfer. This embodiment also continues to load addresses of instructions that were the target of the control transfer instruction responsive to prediction information contained in the block entry. Where the control transfer instruction specifies a return address (for example, but without limitation a call instruction, or trap instruction) the return address can be stored in a return-address predictor. Thus, the instruction fetch and decode pipeline is kept full. If, during decoding and execution of the control transfer instruction the control transfer is detected to have one or more incorrectly predicted attributes (for example, incorrect outcome, target, type etc.), the computer pipeline can be flushed and the block entry modified to update the predictor.

Each block entry in the fetch-block branch target buffer includes a length value that indicates the amount of memory that contains the instructions represented by the block entry. This memory is the fetch-block represented by the block entry. The block entry can also include an indicator for the type of control transfer instruction that terminates the block.

Figure 1:
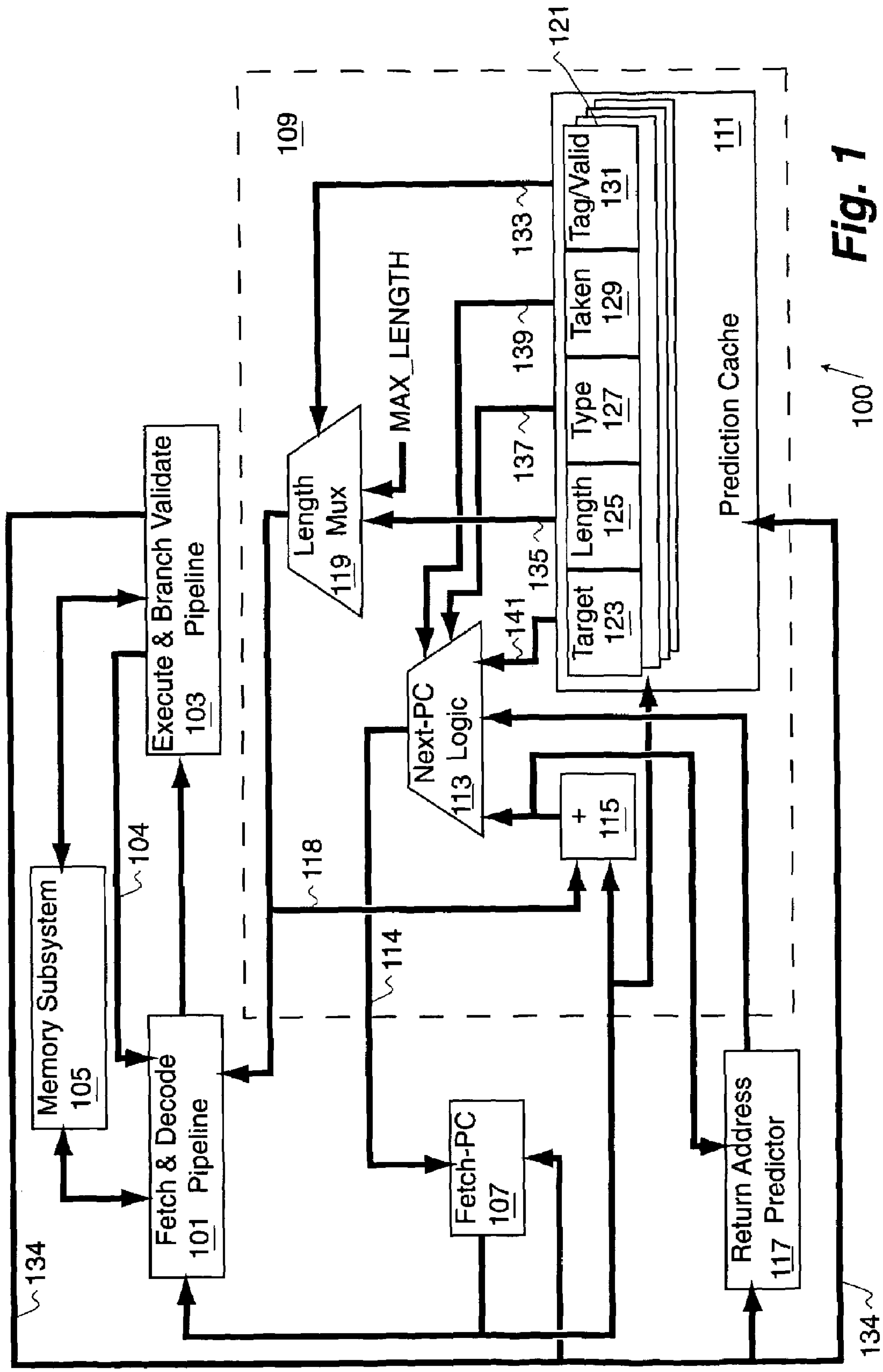
FIG. 1 shows a block diagram of a portion of a processor having a control-transfer predictor using a fetch-block branch target buffer.

FIG. 1 illustrates a pipelined processor, indicated by general reference character 100, that illustrates one embodiment of the invention. The pipelined processor 100 includes an 'instruction fetch and decode' pipeline 101 and an 'instruction execution and branch validation' pipeline 103. The 'instruction fetch and decode' pipeline 101 fetches instructions from a memory subsystem 105, decodes the fetched instructions and feeds the decoded instructions to the 'instruction execution and branch validation' pipeline 103 for execution. The pipeline stages of the processor operate concurrently on sequences of instructions in a pipelined manner. Pipeline operation is known in the art of processor design. If the executed instruction is a control transfer instruction that does not take the predicted path (the path prediction is subsequently described with respect to FIG. 2), then the 'instruction execution and branch validation' pipeline 103 is flushed. In addition, the 'instruction execution and branch validation' pipeline 103 communicates this situation (via a 'flush fetch' signal 104) back to the 'instruction fetch and decode' pipeline 101. The 'instruction fetch and decode' pipeline 101 also flushes in response to this communication. Processes for correcting the prediction responsive to the decoding and execution of the fetched instruction are described with regard to FIGS. 3A, 3B, and 4.

The memory subsystem 105 can be cached. Memory caching operations, as well as other aspects of reading and writing memory locations, are known in the art of computer memories, and so are not further described herein except where applicable to aspects of the invention.

The 'instruction fetch and decode' pipeline 101 can be loaded responsive to an address stored in a fetch-program counter register 107 (Fetch-PC). This address can be also communicated to a fetch-block branch target buffer 109 (BTB) that includes a branch prediction cache 111.

The fetch-program counter register 107 can be loaded from a 'next-pc' logic 113 (that generates a 'next-pc' signal 114) from values provided by an adder 115, the branch prediction cache 111, or a return address predictor 117 (RAP).

The 'instruction fetch and decode' pipeline 101 can fetch multiple instructions from the memory subsystem 105. The amount of memory containing instructions to be fetched can be set by a 'fetch-length' signal 118 that is provided by a fetch length multiplexer 119 as is subsequently described.

The branch prediction cache 111 includes a block entry 121 that associates a number of values with an address provided from the fetch-program counter register 107. The block entry 121 stores these values in a 'target' entry 123, a 'length' entry 125, a 'type' entry 127, a 'taken' entry 129 and a 'tag valid' entry 131. These values are made available from the fetch-block branch target buffer 109 responsive to the assertion of the address in the fetch-program counter register 107. As is well known in the caching art, the 'tag valid' entry 131 can be used to determine a 'hit' signal 133. The 'hit' signal 133 is provided to the fetch length multiplexer 119 to select either the maximum length of instruction memory that can be loaded into the 'instruction fetch and decode' pipeline 101 or a 'length' signal 135 generated from the value stored in the 'length' entry 125 of the block entry 121 associated with the address from the fetch-program counter register 107. The selected signal is the 'fetch-length' signal 118 that conditions the 'instruction fetch and decode' pipeline 101 to fetch that amount of information (starting at the address held in the fetch-program counter register 107) from the memory subsystem 105.

The entries 123, 125, 127, 129, 131 are created and/or modified by the 'instruction execution and branch validation' pipeline 103 when a control transfer instruction executes by an 'update predictor' signal 134. The operations performed by the 'instruction execution and branch validation' pipeline 103 are subsequently described. The block entry 121 can also be created and invalidated by the 'instruction fetch and decode' pipeline 101.

When the branch prediction cache 111 receives an address from the fetch-program counter register 107 that retrieves the block entry 121, the entries 123, 125, 127, 129, 131 generate the corresponding signals (a 'target address' signal 141, the 'length' signal 135, a 'type' signal 137, a 'taken' signal 139, and the 'hit' signal 133 respectively).

The fetch-program counter register 107 can be loaded from the 'next-pc' logic 113. The fetch-program counter register 107 has as its inputs a signal from the adder 115, the 'target address' signal 141 from the branch prediction cache 111, and a return address value supplied by the return address predictor 117. The signal from the adder 115 is the sum of the output of the fetch-program counter register 107 and the 'fetch-length' signal 118 from the fetch length multiplexer 119. Thus, the address provided by the fetch-program counter register 107 to the fetch-block branch target buffer 109 can advance responsive to the 'length' entry 125 of the block entry 121. In addition, the fetch-program counter register 107 can be loaded by the 'instruction fetch and decode' pipeline 101 or the 'instruction fetch and decode' pipeline 101 when either pipeline is flushed.

The selection of which value to load into the fetch-program counter register 107 is responsive to the 'type' signal 137 and the 'taken' signal 139 generated from the branch prediction cache 111. If the 'hit' signal 133 indicates a cache miss, the 'taken' signal 139 indicates the same as if the branch is not to be taken. In this circumstance, the 'fetch-length' signal 118 will not be responsive to the 'length' signal 135 but instead will be the maximum fetch length.

If the 'hit' signal 133 indicates a cache hit, the fetch length multiplexer 119 is conditioned to use the 'length' signal 135. The 'next-pc' logic 113 also selects the next value for the fetch-program counter register 107 responsive to the 'type' signal 137 and the 'taken' signal 139 from the 'target address' signal 141, the output from the return address predictor 117 and the output from the adder 115.

If the control transfer instruction that caused the creation of the block entry 121 is a return type instruction (RETURN) the address for the fetch-program counter register 107 is provided by the return address predictor 117. A return type instruction can be an instruction that causes a control transfer back to an instruction following a prior control transfer instruction (for example, but without limitation, a return instruction, a return from trap instruction, and a return from interrupt instruction). Common embodiments for these instructions use return information from a stack. Similar return information is stored in the return address predictor 117 and is provided to the 'next-pc' logic 113. The return information is selected at the 'next-pc' logic 113 when the 'type' signal 137 indicates the control transfer instruction is a return type instruction. The return address predictor 117 stack is popped to remove the return address from the stack when it is used.

If the control transfer instruction that caused the creation of the block entry 121 is an unconditional control transfer instruction (UNCND) the 'next-pc' logic 113 selects the 'target address' signal 141.

If the control transfer instruction that caused the creation of the block entry 121 is a call control transfer instruction (CALL) the 'next-pc' logic 113 selects the 'target address' signal 141 and pushes the return address onto the stack maintained by the return address predictor 117.

If the control transfer instruction that caused the creation of the block entry 121 is a conditional control transfer instruction (CND) the 'next-pc' logic 113 selects the 'target address' signal 141 or the output from the adder 115 dependent on the 'taken' signal 139.

The 'taken' signal 139 can include a single, multiple bit, or correlated predictor state as is known in the art of branch prediction.

The branch prediction cache 111 can be disposed as a four-way set associative content addressable memory (CAM). However, there is no particular requirement for this storage format. In alternative embodiments, the branch prediction cache 111 can include a direct mapped content addressable memory (CAM), fully associative CAM, a memory array, a heap, a tree, a trie, a linked list, a hash table, or some other storage format.

The 'instruction execution and branch validation' pipeline 103 eventually executes the control transfer instruction fetched by the 'instruction fetch and decode' pipeline 101. As the instruction is executed, the 'instruction execution and branch validation' pipeline 103 writes the block entry 121 into the branch prediction cache 111. If the instruction has previously executed, the block entry 121 can be updated. If the block entry 121 does not exist, it is created. The entries 123, 125, 127, 129, 131 are updated as:

For a return-type instruction: the 'taken' entry 129 is set true, the 'type' entry 127 is set to RETURN, the 'target' entry 123 is set to an arbitrary value (because the target address is provided by the return address predictor 117), and the 'length' entry 125 is set to the maximum length value or the amount of memory prior to and including the return-type instruction from the start of currently executed fetch-block. In addition, the return address predictor 117 is popped so as to correspond with executed program flow.

For an unconditional jump control transfer instruction: the 'taken' entry 129 is set true, the 'type' entry 127 is set to UNCND, the 'target' entry 123 is set to the target address of the control transfer instruction, and the 'length' entry 125 is set to the maximum length value or the amount of memory prior to and including the unconditional control transfer instruction from the start of currently executed fetch-block.

For a call control transfer instruction: the 'taken' entry 129 is set true, the 'type' entry 127 is set to CALL, the 'target' entry 123 is set to the target address of the control transfer instruction, and the 'length' entry 125 is set to the maximum length value or the amount of memory prior to and including the call control transfer instruction from the start of currently executed fetch-block. In addition, the return address is pushed onto stack of the return address predictor 117.

For a conditional control transfer instruction: the 'taken' entry 129 is set dependent on the result of the execution of the conditional control transfer instruction (one skilled in the art will understand that the 'taken' entry 129 can be single bit, multiple bit, or correlated predictor, the 'type' entry 127 is set to CND, the 'target' entry 123 is set to the target address of the control transfer instruction, and the 'length' entry 125 is set to the maximum length value or the amount of memory prior to and including conditional control transfer instruction from the start of currently executed fetch-block. In addition, if the result of the execution of the conditional control transfer instruction is different than that predicted, the new address is loaded into the fetch-program counter register 107 and the 'instruction fetch and decode' pipeline 101 and the 'instruction execution and branch validation' pipeline 103 are flushed.

In each case above, a tag generated from the address of the executed control transfer instruction is stored and made valid in the 'tag valid' entry 131.

The process continues for the new address loaded into the fetch-program counter register 107. Thus, the 'instruction fetch and decode' pipeline 101 is preloaded with instructions starting at the target address.

Figure 2:
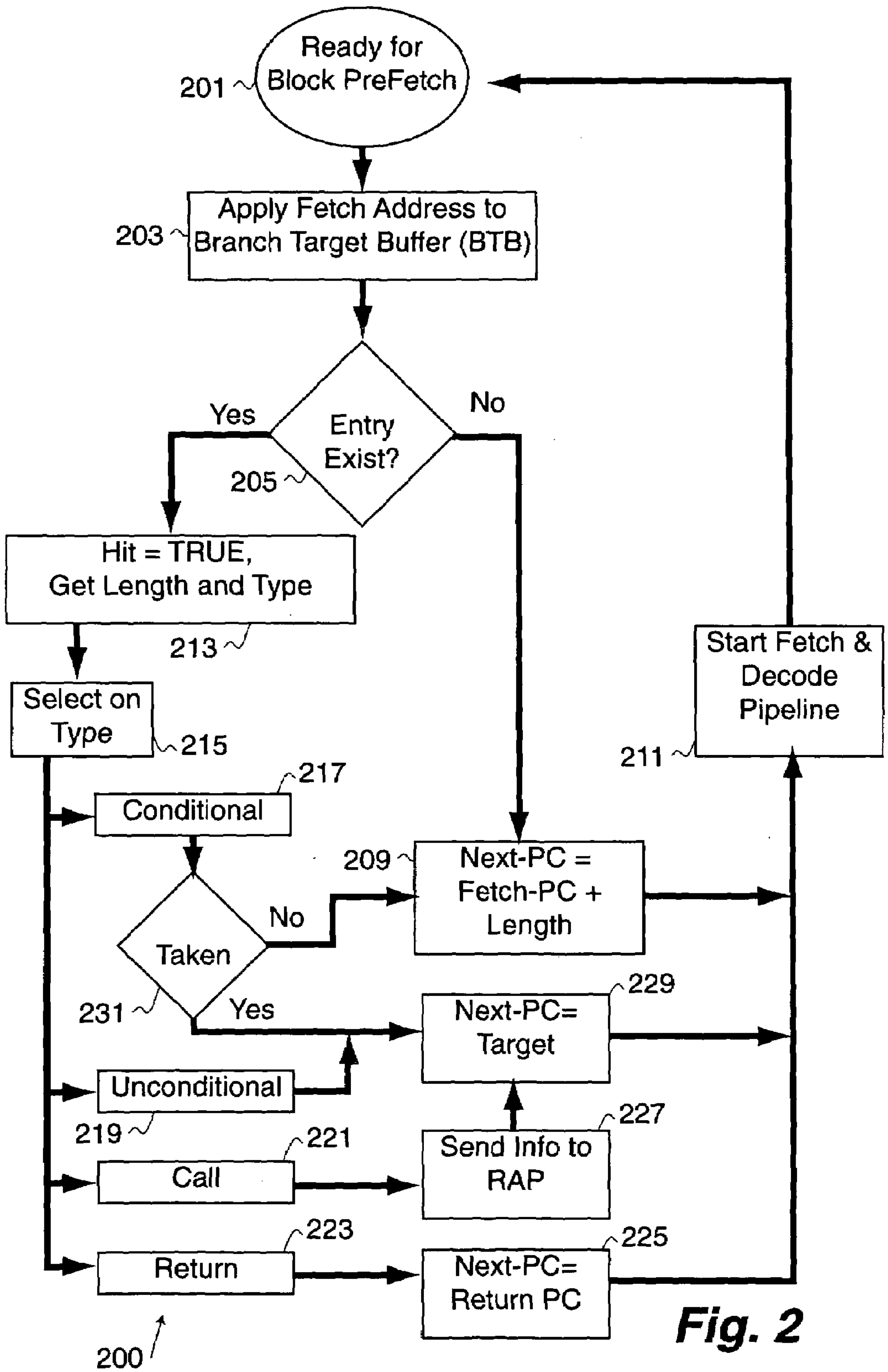
FIG. 2 shows a method for using the control transfer predictor.
Figure 3A:
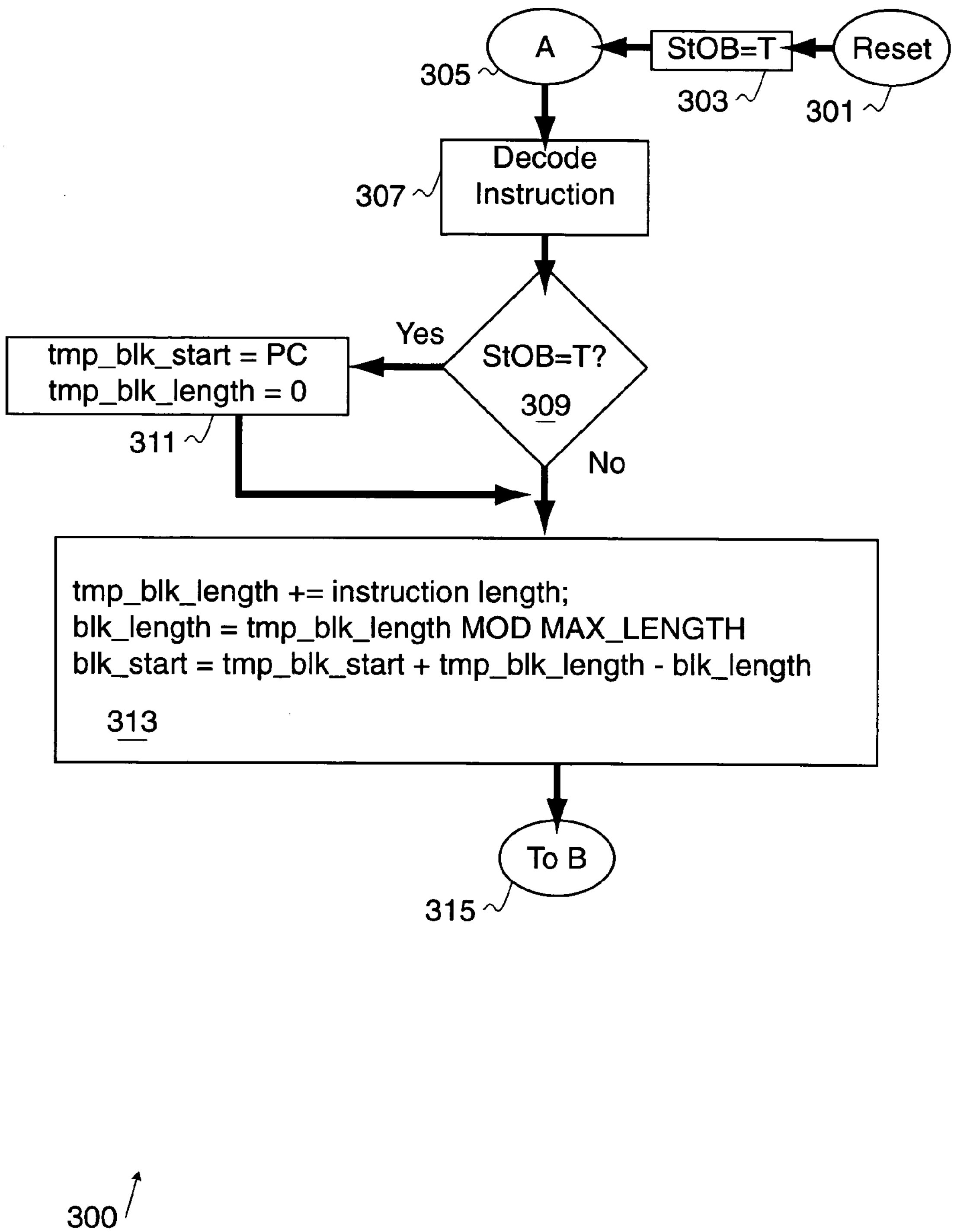
FIGS. 3A & 3B show a method used in the instruction fetch and decode pipeline to correct the fetch-block branch target buffer and adjust the pipeline accordingly.
Figure 3B:
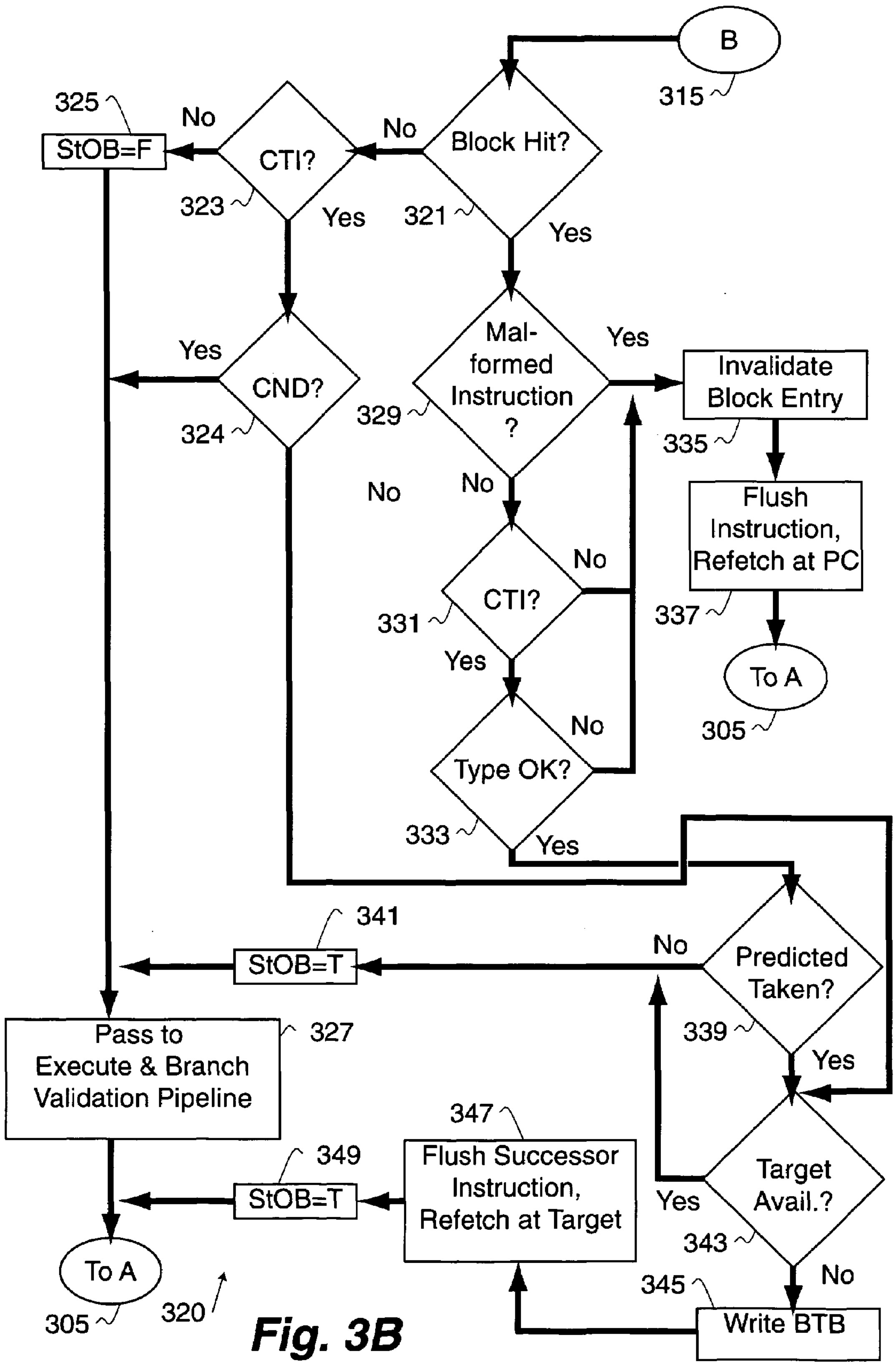
Figure 4:
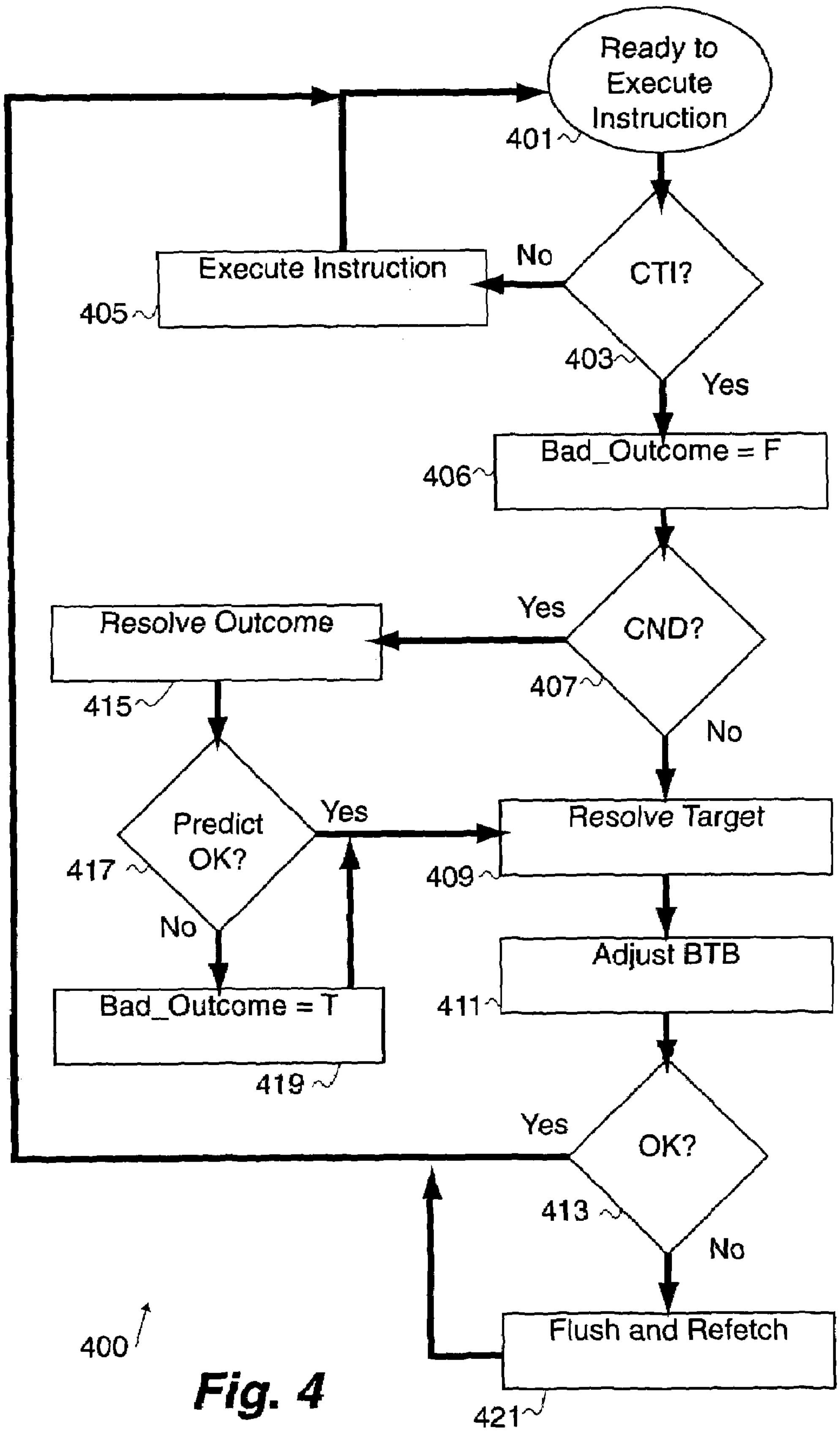
FIG. 4 shows a method used in the execution and branch validation pipeline to correct the fetch-block branch target buffer and adjust the pipeline accordingly.

The architecture of FIG. 1 is used by the subsequently described processes. FIG. 2 illustrates the prefetch prediction process. FIGS. 3A and 3B illustrate the block entry correction and pipe flush processes within the 'instruction fetch and decode' pipeline 101. FIG. 4 illustrates the block entry correction and pipe flush processes within the 'instruction execution and branch validation' pipeline 103.

FIG. 2 illustrates a prefetch prediction process, indicated by general reference character 200, used by the pipelined processor 100 to select which address to input to the 'instruction fetch and decode' pipeline 101. Information that the prefetch prediction process 200 provides to the 'instruction fetch and decode' pipeline 101 includes the fetch-pc (the memory address from which to fetch instructions that will be executed by the 'instruction execution and branch validation' pipeline 103), the block length of the memory represented by the block entry 121, the type of the block entry 121, and whether the fetch-pc address hit the block entry 121.

The prefetch prediction process 200 starts at a 'ready' step 201 where the 'instruction fetch and decode' pipeline 101 is ready to accept an address and length to memory containing instructions. Once started, the prefetch prediction process 200 continues to an 'apply address' step 203 that applies the value in the fetch-program counter register 107 to the fetch-block branch target buffer 109. An 'entry exists decision' step 205 determines whether an entry exists in the branch prediction cache 111 that corresponds to the supplied address. If no entry exists, the prefetch prediction process 200 continues to a 'set next-pc step 209 that selects the 'next-pc' signal 114 to be the output of the adder 115 (thus, next-pc=fetch-pc+MAX_LENGTH). This value is loaded into the fetch-program counter register 107. A 'start fetch and decode pipeline' step 211 then starts the 'instruction fetch and decode' pipeline 101 using the value of the fetch-program counter register 107, the 'length' signal 135, the 'type' signal 137, and the 'tag valid' entry 131. The prefetch prediction process 200 then continues back to the 'ready' step 201 to prefetch more instructions.

However if the 'entry exists decision' step 205 determines that a matching block entry exists for the provided address, the prefetch prediction process 200 continues to an 'access length and type' step 213 that determines the 'length' signal 135 and the 'type' signal 137 from the block entry 121 in the branch prediction cache 111 that corresponds to the provided address. The 'hit' signal 133 is also set to TRUE (from the 'tag valid' entry 131). A 'select type' step 215 then determines which steps are to be processed responding to the 'type' signal 137. The prefetch prediction process 200 determines whether the block entry 121 corresponds to a 'conditional branch' select 217, an 'unconditional branch' select 219, a 'call branch' select 221, or a 'return branch' select 223.

The actual length used is the 'fetch-length' signal 118 resulting from the fetch length multiplexer 119 (thus, the length is either the MAX_LENGTH or the 'length' signal 135).

If the 'type' signal 137 is a RETURN, the prefetch prediction process 200 continues to the 'return branch' select 223 and to a 'load return pc' step 225 that selects the 'next-pc' signal 114 to be that returned by the return address predictor 117 and the prefetch prediction process 200 continues to the 'start fetch and decode pipeline' step 211 for processing as has been previously described.

If the 'type' signal 137 is a CALL, the prefetch prediction process 200 continues to the 'call branch' select 221 and to a 'load return address predictor' step 227 that loads the return address into the return address predictor 117 for retrieval by the corresponding return branch. Next, the prefetch prediction process 200 continues to a 'load target pc' step 229 that loads the 'target address' signal 141 into the fetch-program counter register 107. Next the prefetch prediction process 200 continues to the 'start fetch and decode pipeline' step 211 for processing as has been previously described.

If the 'type' signal 137 is UNCND, the prefetch prediction process 200 continues to the 'unconditional branch' select 219 and to the 'load target pc' step 229 that loads the 'target address' signal 141 into the fetch-program counter register 107. Next the prefetch prediction process 200 continues to the 'start fetch and decode pipeline' step 211 for processing as has been previously described.

If the 'type' signal 137 is CND, the prefetch prediction process 200 continues to the 'conditional branch' select 217 and then to a 'conditional branch taken decision step 231 that uses the information in the 'taken' entry 129 of the block entry 121 to predict whether the branch will be taken. If the prediction is that the branch will not be taken, the prefetch prediction process 200 continues to the 'set next-pc step 209 that sets the value in the fetch-program counter register 107 to be the output of the adder 115. Next the prefetch prediction process 200 continues to the 'start fetch and decode pipeline' step 211 for processing as has been previously described.

One skilled in the art will understand that additional instruction types can be handled by the invention. In particular, "conditional call instructions" and "conditional return instructions" can be handled using techniques similar to those described.

However, if the prediction is that the branch will be taken, the prefetch prediction process 200 continues to the 'load target pc' step 229 that loads the 'target address' signal 141 into the fetch-program counter register 107. Next the prefetch prediction process 200 continues to the 'start fetch and decode pipeline' step 211 for processing as has been previously described.

One skilled in the art will understand that the prefetch prediction process 200 can be implemented in many different, but equivalent, ways other than the way used by the previously described embodiment. Such a one also will understand that there exist many techniques that can be used to pipeline or parallelize performance of these steps.

FIG. 3A illustrates a first prediction correction process, indicated by general reference character 300, for correcting a block entry during operation of the 'instruction fetch and decode' pipeline 101. This process is applied after the instruction is fetched from the memory subsystem 105. This process feeds the 'instruction execution and branch validation' pipeline 103 and (if required) corrects the fetch-block branch target buffer 109 and flushes the 'instruction fetch and decode' pipeline 101.

In response to a reset condition (such as by a power on condition or other initialization condition) the process 300 initiates at a 'reset' step 301 and advances to a 'set StOB TRUE' step 303 that indicates that the process is at a start of a block. The process 300 continues to an 'A' flow point 305 that is the destination step for subsequent iterations. Next, the process 300 continues to a 'decode instruction' step 307 that decodes the fetched instruction. An 'StOB decision' step 309 then determines whether the start-of-block signal is True. If so, the tmp_blk_start register is initialized, by an 'initialize temporary start address' step 311, to the program counter that corresponds to the instruction decoded by the 'decode instruction' step 307. In addition, the 'initialize temporary start address' step 311 initializes the tmp_blk_length value to zero. Once tmp_blk_start is initialized (or if the 'StOB decision' step 309 determines that the start-of-block signal is False), the process 300 continues to an 'initialize values' step 313.

The maximum size of the memory represented by the block entry is the MAX_LENGTH value.

The 'initialize values' step 313 adds the instruction length to the tmp_blk_length value; sets a blk_length value to the tmp_blk_length MOD MAX_LENGTH; and sets the blk_start value to tmp_blk_start+tmp_blk_length−blk_length. Thus, blk_start represents an index into the memory represented by the block entry 121 from which the instruction is being fetched and blk_length is the amount of memory that is to be fetched.

These values are updated for every instruction that is decoded and are used when correcting, invalidating, or creating the block entry 121 that corresponds to the instruction.

The process 300 advances to a continuation of the first prediction correction process, indicated by general reference character 320 and shown in FIG. 3B through a 'B' flow point 315.

A 'block hit' decision step 321 determines whether the fetched instruction supplied to the 'instruction fetch and decode' pipeline 101 generated the 'hit' signal 133 from the branch prediction cache 111. If not, the process 320 continues to a 'control transfer instruction' decision step 323 that determines whether the instruction decoded at the 'decode instruction' step 307 is a control transfer instruction. If the instruction is not a control transfer instruction the process 320 continues to a 'set StOB false' step 325. A 'pass instruction to execution pipe' step 327 then passes the instruction to the 'instruction execution and branch validation' pipeline 103 for execution and the process 300 continues to the 'A' flow point 305 on FIG. 3A.

However, if the 'block hit' decision step 321 determines that the 'hit' signal 133 was present (indicating that the instruction has previously been executed) the process 320 continues to a 'malformed instruction' decision step 329 that verifies that the instruction is a valid instruction (for example, that the branch predictor correctly terminated the fetch-block on the last code byte of the decoded instruction and not other code bytes within that instruction). If the instruction is valid (that is, not malformed) the process 320 advances to a 'control transfer instruction' decision step 331 that determines whether the instruction is a control transfer instruction. If so, the instruction is next checked to verify that the type of the control transfer instruction is valid at a 'valid type' decision step 333. If any of these steps fail, the process 320 continues to an 'invalidate block entry' step 335 that invalidates the block entry 121 that associated with the instruction (that is, the block entry 121 associated with the value of blk_start). In addition a 'flush instruction' step 337 flushes the 'instruction fetch and decode' pipeline 101 starting at the current instruction and fetches instructions from the memory subsystem 105 starting at the current PC. This includes resetting the fetch-program counter register 107 to the current PC and performing the prefetch prediction process 200 but as applied to the block entry 121 in the branch prediction cache 111 now invalidated, this will cause the branch prediction step (performed while refetching the instruction residing in program memory at the current PC) to miss in the fetch-block branch target buffer 109. The process 320 then continues to the 'A' flow point 305 to continue processing new instructions.

However, if the 'valid type' decision step 333 determines that the type of the control transfer instruction is valid, the process 320 continues to a 'prediction valid' decision step 339 that determines whether the 'taken' entry 129 in the block entry 121 indicates the branch is to be taken. If not, the process 320 continues to a 'set StOB true' step 341 that indicates that sets start-of-block to TRUE and the instruction is passed to the 'pass instruction to execution pipe' step 327 for execution. The process 320 then continues to the 'A' flow point 305 to process additional instructions.

However, if the 'prediction valid' decision step 339 determines that the branch is to be taken, the process 320 continues to a 'target available and correct' decision step 343 that determines whether the instruction contains the target address within the instruction and that the target address provided by the block entry 121 is correct as compared with the specified address contained within the instruction. If so, the process 320 continues to the 'set StOB true' step 341 as has been previously described.

If the target address is incorrect at the 'target available and correct' decision step 343, the process 320 continues to a 'write block entry' step 345 that writes the block entry 121 using values in blk_length and blk_start. Next, a 'flush successor instruction' step 347 flushes the pipeline of instructions having been fetched after the current instruction and starts the fetch process at the target address (that is, the fetch-program counter register 107 is reset to the target address). Then a 'set StOB true' step 349 is performed and the process 320 continues to the 'A' flow point 305 without passing the instruction to the 'instruction execution and branch validation' pipeline 103.

Looking again at the 'control transfer instruction' decision step 323, if the fetched instruction is a conditional control transfer instruction, the process 320 continues to the 'target available and correct' decision step 343 for processing as has been previously described. Otherwise, the instruction is passed to the 'instruction execution and branch validation' pipeline 103.

FIG. 4 illustrates an execute-time BTB correction process, indicated by general reference character 400, used to detect when the execution of the control transfer instruction is different from the predicted outcome and target, and to adjust the fetch-block branch target buffer appropriately. The process 400 repeats through a 'ready to execute instruction' flow point 401 and continues to a 'control transfer instruction' decision step 403 that examines the decoded instruction to determine whether the instruction is a control transfer instruction. If the instruction is not a control transfer instruction, the process 400 continues to an 'execute instruction' step 405 that executes the instruction.

However, if the instruction at the 'control transfer instruction' decision step 403 is a control transfer instruction, the process 400 then continues to an 'initialize bad_outcome signal' step 406 that sets the bad_outcome signal to FALSE. Next, the process 400 determines whether the instruction is a conditional control transfer instruction at a 'conditional CTI' decision step 407. If the control transfer instruction is not conditional, the process 400 continues to a 'resolve target address' step 409 that evaluates the target address of the control transfer instruction. Next, an 'adjust BTB' step 411 adjusts the prediction (the 'taken' entry 129) and the 'target' entry 123 in the block entry 121 at the address in blk_start. An 'operation OK' decision step 413 evaluates whether the target resolved by the 'resolve target address' step 409 was the same as the predicted target and that the NOT bad_outcome signal are TRUE (thus, whether the execution of the instruction occurred as predicted). If so, the process 400 continues to the 'ready to execute instruction' flow point 401 to execute the next instruction.

However, if the 'conditional CTI' decision step 407 determines that the control transfer instruction is a conditional CTI, the process 400 continues to a 'resolve outcome' step 415 that determines whether the conditional branch is to be taken (and sets the bad_outcome signal FALSE). Next, a 'prediction OK' decision step 417 determines whether the outcome of the execution of the instruction was the same as the outcome predicted by the block entry 121. If the outcome of the execution was as predicted the process 400 continues to the 'resolve target address' step 409 and continues as previously described.

However, if the 'prediction OK' decision step 417 determines that the execution of the instruction resulted in an outcome different than the predicted outcome, the process 400 continues to a 'set bad_outcome signal' step 419 that sets the bad_outcome signal TRUE. The process 400 continues to the 'resolve target address' step 409 and continues as previously described.

Looking again at the 'operation OK' decision step 413. The 'operation OK' decision step 413 evaluates whether the target resolved by the 'resolve target address' step 409 was the same as the predicted target and that the NOT bad_outcome signal are TRUE. If not, the process 400 continues to a 'flush execution pipeline and refresh' step 421 that flush successor instructions from the pipelines and restarts the instruction fetch pipeline at the target address.

From the foregoing, it will be appreciated that the invention has (without limitation) the following advantages:

1) The invention's use of the block entry concept enables preloading of the fetch pipeline responsive to control transfer instructions prior to those instructions being fetched and decoded, that is, the processor does not waste any cycles to flush a fetch pipeline for execution of an instruction that alters sequential flow of instructions where the alteration in the control flow is correctly predicted.

2) The invention provides a way for preloading multiple instructions into the fetch pipeline even across control transfer instructions.

3) The invention provides a way for pre loading multiple instructions into the fetch pipeline without extra hardware that would have been required to check if there is branch history for each and every instruction recorded in the branch target buffer.

Although preferred embodiments are disclosed herein, many variations are possible which remain within the concept, scope, and spirit of the invention, and these variations would become clear to those skilled in the art after perusal of this application. In particular, one skilled in the art would be able to design hardware or software embodiments of the disclosed steps.

What is claimed is:

1. A method for performing branch prediction in a pipelined processor, said method comprising the steps of:

detecting a control transfer resulting from execution of a control transfer instruction;

recording a set of information about the control transfer instruction in a block entry of a fetch-block branch target buffer, said set of information including a fetch-block address of a first fetch-block containing a plurality of instructions and including said control transfer instruction, a target address of said control transfer instruction, and a length value representing an amount of memory needed to contain the plurality of instructions in the first fetch-block;

determining that said plurality of instructions from said first fetch-block will again be fetched;

predicting whether said control transfer will occur when said control transfer instruction is again executed using the fetch-block address of the first fetch-block; and fetching a second fetch block, responsive to the step of predicting, for execution after execution of said control transfer instruction.

2. The method of claim 1 wherein the step of determining includes steps of:

maintaining a fetch-program counter register for driving an instruction fetch pipeline;

applying a first address from said fetch-program counter register to said fetch-block branch target buffer to select said block entry associated with said first fetch-block; and loading a second address responsive to said block entry into said fetch-program counter register.

3. The method of claim 1 wherein the control transfer instruction is one of a call instruction, a conditional call instruction, a return instruction, a conditional return instruction, an unconditional transfer instruction, a conditional transfer instruction, and a trap instruction.

4. The method of claim 1 wherein the step of fetching further includes steps of:

decoding said control transfer instruction; and validating said control transfer instruction.

5. The method of claim 4 wherein the step of fetching further includes steps of:

invalidating said block entry responsive to the step of validating; and flushing said control transfer instruction responsive to the step of validating.

6. The method of claim 4 wherein the step of fetching further includes steps of:

predicting that said control transfer instruction will cause said control transfer to a specified address;

comparing said target address with said specified address;

writing said block entry with said specified address responsive to the step of comparing;

flushing a successor instruction; and fetching at said target address.

7. The method of claim 4 wherein the step of fetching further includes passing said control transfer instruction to be executed to an instruction execute pipeline.

8. The method of claim 4 wherein the step of validating further includes steps of:

detecting that said control transfer instruction is malformed;

invalidating said block entry responsive to the step of validating; and flushing said control transfer instruction responsive to the step of validating.

9. The method of claim 1 further including steps of:

resolving said target address; and adjusting said block entry associated with said control transfer instruction.

10. The method of claim 9 further including steps of:

determining that said control transfer instruction is a conditional control transfer instruction;

detecting whether the step of predicting correctly predicted an outcome of said control transfer instruction as executed; and flushing, responsive to the step of detecting, an instruction execute pipeline.

11. The method of claim 10 further wherein the step of flushing also flushes said instruction fetch pipeline.

12. The method of claim 1 further wherein the step of predicting uses a single bit predictor.

13. The method of claim 1 further wherein the step of predicting uses a multiple bit predictor.

14. The method of claim 1 further wherein the step of predicting uses a correlated predictor.

15. The method of claim 1, further comprising:

selecting one of the length value associated with the first fetch-block and a maximum length; and fetching at least a portion of the first fetch-block using the selected length.

16. A method for performing branch prediction in a pipelined processor, the method comprising the steps of:

detecting a control transfer resulting from execution of a control transfer instruction;

recording a set of information about the control transfer instruction in a block entry of a fetch-block branch target buffer, the set of information including a fetch-block address of a first fetch-block containing a plurality of instructions and including the control transfer instruction, a target address of the control transfer instruction, and a length value;

determining that the plurality of instructions from the first fetch-block will again be fetched;

predicting whether the control transfer will occur when the control transfer instruction is again executed using the fetch-block address of the first fetch-block; and fetching a second fetch block, responsive to the step of predicting, for execution after execution of the control transfer instruction;

wherein the step of recording includes determining "blk__length=tmp__blk__length MOD MAX__LENGTH" and "blk__start=tmp__blk__start+tmp__blk__length−blk__length";

wherein blk__length represents the length value;

wherein tmp__blk__length represents a temporary value associated with the length value;

wherein MAX_LENGTH represents a maximum size of the block entry;

wherein blk_start represents the fetch-block address of the first fetch-block; and wherein tmp_blk_start represents a temporary start address associated with the first fetch-block.

17. An apparatus comprising:

an instruction fetch pipeline within a processor in communication with a memory;

an instruction execute pipeline configured to execute a plurality of instructions fetched by the instruction fetch pipeline; and a branch prediction cache in communication with the instruction fetch pipeline, said memory and the instruction execution pipeline, the branch prediction cache capable of holding at least one block entry associating a first fetch-block with said plurality of instructions, the at least one block entry comprising a length value representing an amount of memory needed to contain the plurality of instructions associated with the first fetch-block.

18. The apparatus of claim 17 configured to load said instruction fetch pipeline with said plurality of instructions by prefetching a length of said memory represented by said first fetch-block.

19. The apparatus of claim 17 wherein said at least one block entry further associates a predictor, a target, and a type with said first fetch-block.

20. The apparatus of claim 19 wherein said predictor is a single bit predictor.

21. The apparatus of claim 19 wherein said predictor is a multiple bit predictor.

22. The apparatus of claim 19 wherein said predictor is a correlated predictor.

23. The apparatus of claim 19 wherein said plurality of instructions comprise a control transfer instruction, the branch prediction cache includes a target value associated with said plurality of instructions and said predictor determines whether to apply said target value to the instruction fetch pipeline.

24. The apparatus of claim 23 wherein the branch prediction cache includes a type value indicating that said control transfer instruction is one of a call instruction, a conditional call instruction, a return instruction, a conditional return instruction, an unconditional transfer instruction, and a conditional transfer instruction.

25. The apparatus of claim 17 further including a return address predictor, the branch prediction cache further including a type value indicating said control transfer instruction is a return instruction, and a logic unit to apply a return address obtained from said return address predictor to the instruction fetch pipeline.

26. The apparatus of claim 17 further including:

a validation mechanism configured to validate a control transfer instruction in said plurality of instructions; and a flush mechanism configured to flush said instruction execute pipeline and said instruction fetch pipeline responsive to the validation mechanism.

27. The apparatus of claim 26 wherein the validation mechanism includes:

a detection mechanism configured to detect that said control transfer instruction is malformed; and an invalidation mechanism configured to invalidate said block entry responsive to the detection mechanism.

28. An apparatus comprising:

an instruction fetch pipeline within a processor in communication with a memory;

an instruction execute pipeline configured to execute a plurality of instructions fetched by the instruction fetch pipeline;

a branch prediction cache in communication with the instruction fetch pipeline, the memory and the instruction execution pipeline, the branch prediction cache capable of holding at least one block entry associating a first fetch-block with the plurality of instructions; and a fetch-block creation mechanism configured to create said first fetch-block including means for calculating "blk_length=tmp_blk_length MOD MAX_LENGTH," and means for calculating "blk_start=tmp_blk_start+tmp_blk_length−blk_length";

wherein blk_length represents the length value;

wherein tmp_blk_length represents a temporary value associated with the length value;

wherein MAX_LENGTH represents a maximum size of the block entry;

wherein blk_start represents the fetch-block address of the first fetch-block; and wherein tmp_blk_start represents a temporary start address associated with the first fetch-block.

29. The apparatus of claim 17, further comprising a length multiplexer operable to select one of the length value associated with the first fetch-block and a maximum length; and wherein the instruction fetch pipeline is operable to fetch at least a portion of the first fetch-block using the selected length.

* * * * *